Figure 1:
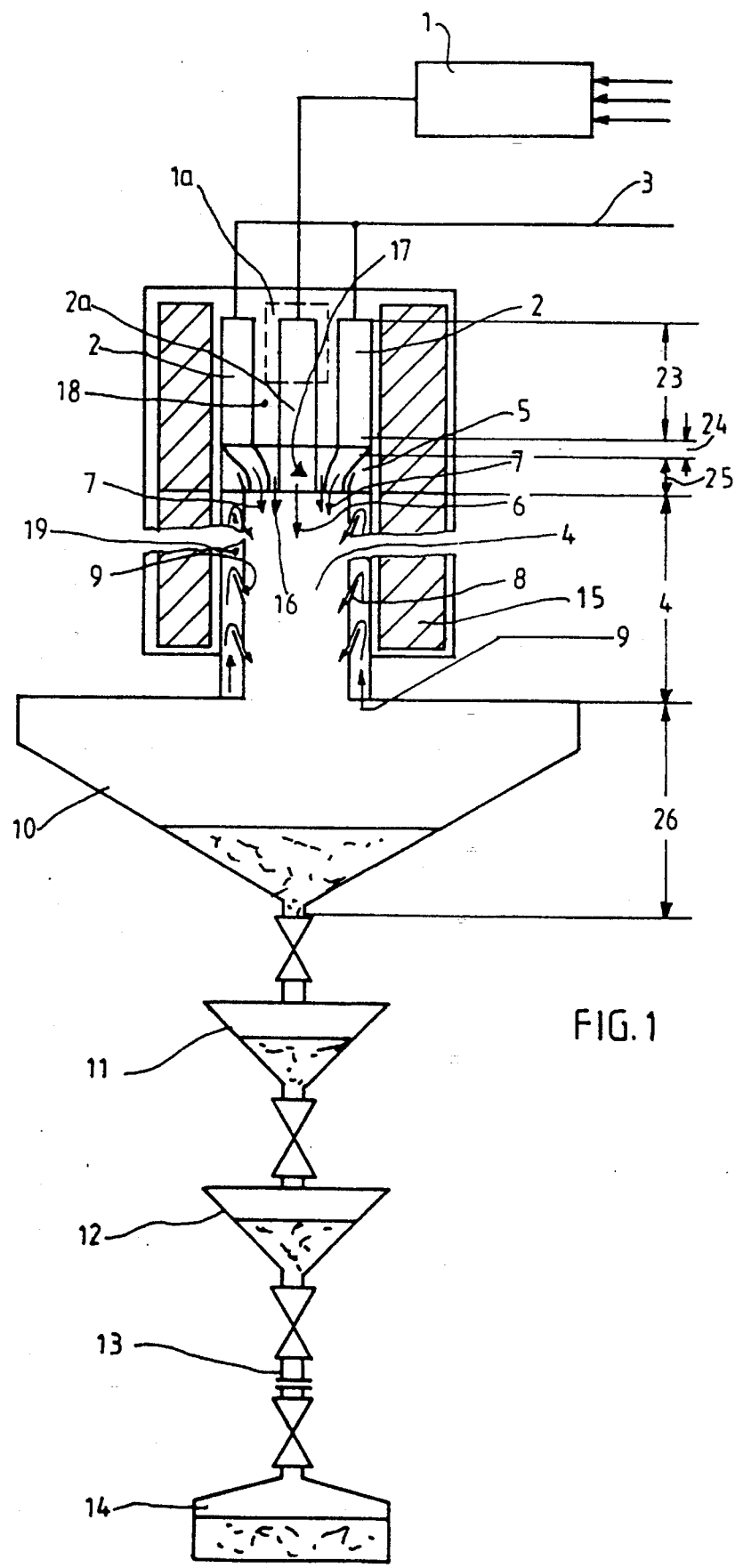

United States Patent [19]
König

[11] Patent Number: 5,472,477
[45] Date of Patent: Dec. 5, 1995

[54] PROCESS FOR THE PREPARATION OF FINELY DIVIDED METAL AND CERAMIC POWDERS

[75] Inventor: Theo König, Laufenburg-Rotzel, Germany

[73] Assignee: H.C. Starck GmbH & Co. KG, Goslar, Germany

[21] Appl. No.: 50,590

[22] Filed: Apr. 22, 1993

[30] Foreign Application Priority Data

May 4, 1992 [DE] Germany .......................... 42 14 719.0

[51] Int. Cl.⁶ .................................. C01G 21/14
[52] U.S. Cl. .............................. 75/343; 75/367; 423/439; 423/440; 423/561.1; 423/565; 423/605; 423/606; 423/608; 423/632; 423/633; 423/659; 427/215
[58] Field of Search ...................... 423/411, 439, 423/440, 561.1, 565, 605, 606, 608, 632, 633, 659; 75/629, 343, 367; 427/215

[56] References Cited

U.S. PATENT DOCUMENTS

| | | | |
|---|---|---|---|
| 3,525,595 | 8/1970 | Zirngibl et al. | 423/411 |
| 4,642,207 | 2/1987 | Uda et al. | 264/10 |
| 4,689,075 | 8/1987 | Uda et al. | 75/0.5 BB |
| 4,994,107 | 2/1991 | Flagan et al. | 75/367 |
| 5,002,646 | 3/1991 | Egerton et al. | 423/411 |
| 5,178,844 | 1/1993 | Carter et al. | 423/411 |

FOREIGN PATENT DOCUMENTS

| | | |
|---|---|---|
| 0151490 | 8/1985 | European Pat. Off. |
| 0152957 | 8/1985 | European Pat. Off. |
| 0290177 | 11/1988 | European Pat. Off. |
| 0379910 | 8/1990 | European Pat. Off. |

OTHER PUBLICATIONS

G. W. Elger, D. E. Traut, G. J. Slavens and S. J. Gerdemann, "Preparation of Submicron Titanium Nitride Powder by Vapor–Phase Reactions", *Metallurgical Transactions B* vol. 20B, (1989) pp. 493–497.
Orbit abstract of EP 0 379 910.

*Primary Examiner*—Donald P. Walsh
*Assistant Examiner*—Anthony R. Chi
*Attorney, Agent, or Firm*—Connolly & Hutz

[57] ABSTRACT

The present invention relates to a process for the preparation of finely divided metal and/or ceramic powders by reacting appropriate metal compounds and appropriate reagents in the gas phase (CVR) chemical vapor reaction, wherein the metal compound(s) and the further reagents are brought to reaction in the gaseous state in a reactor and are subsequently homogeneously condensed directly out of the gas phase, with exclusion of any wall reaction, and are subsequently separated from the reaction medium.

18 Claims, 1 Drawing Sheet

PROCESS FOR THE PREPARATION OF FINELY DIVIDED METAL AND CERAMIC POWDERS

The present invention relates to a process for the preparation of finely divided metal and/or ceramic powders by reacting appropriate metal compounds and appropriate reagents in the gas phase chemical vapour reaction (CVR), wherein the metal compound or compounds and the additional reagents are brought to reaction in the gaseous state in a reactor and subsequently condensed directly homogeneously out of the gaseous phase with preclusion of any wall reaction, and subsequently separated from the reaction medium.

The properties of the initial powders are crucial to the mechanical properties of components prepared by means of powder metallurgy or powder ceramics. Especially, a narrow particle size distribution, high powder uniformity and absence of coarse particle fractions or agglomerates positively affect the properties of the corresponding components.

Numerous processes have become known for industrial preparation of fine metal and ceramic powders. In addition to the purely mechanical comminution and classifying processes, which have the disadvantage that only powders of up to a certain fineness and having a relatively broad particle distribution can be prepared, a number of processes for precipitation from the gaseous phase have also been proposed.

The particle distribution and particle size of the prepared powders cannot be controlled with precision when using energy sources which are sometimes very low, such as e.g. thermal plasma or laser beam, or with turbulent flames, such as e.g. a chlorine-oxyhydrogen burner, and the reaction conditions generally lead to a broad particle distribution and the occurrence of individual particles of diameters many times greater than the average particle size.

It is possible only with difficulty, if at all, to prepare powders having average particle sizes of <0.5 µm, measured in accordance with FSSS (and not individual particle size) using the powder preparation processes which have thus far become known for use on a large industrial scale. It is virtually impossible to preclude the possibility that these conventionally prepared fine powders will contain a certain percentage of coarse-grained material which has a deleterious effect on the mechanical properties of components produced from the material. Conventional grinding processes also result in a very broad particle distribution, which cannot, either, be narrowed down substantially by sifting operations.

Some processes known hitherto for the preparation of the superfine powders via the gas phase work in two stages, the second stage serving the purpose of converting the more or less amorphous intermediate product into crystalline form and separating undesirable by-products which result from the reaction.

Other gas phase processes work not with a flow-technology-optimised hot wall reactor, but using a plasma flame or other energy carriers such as laser beams for the reaction. Disadvantages of these processes are substantially the reaction conditions which cannot in practice be controlled in various regions of the reaction zone, with very steep temperature gradients and/or turbulent flows. The result is powders having a wide particle distribution.

Numerous proposals have been made for processes for the preparation of superfine hard material powders and superfine metal powders, but all are associated with disadvantages. Thus the process disclosed in U.S. Pat. No. 4,994,107, in which a tube reactor is described for the preparation of uniform powders which do not form agglomerates, exhibits considerable disadvantages in terms of its practical application. The start-up of the nucleation reaction is not defined, because all the reagents are mixed upstream of the hot zone. Nor is it possible to prevent wall reactions. This increases the risk of large particles occurring in the otherwise fine powder and being then impossible to remove.

EP-A 0 379 910 describes a two-stage process for the preparation of $Si_3N_4$ from the gas phase, in which the initial halide is blown in liquid form via a two-substance nozzle into the reactor chamber. This process is also unable to prepare a satisfactory powder.

Other proposals for the preparation of very fine uniform powders are reaction in partial vacuum, but also various sol-gel processes. These proposals also exhibit disadvantages such as multiple stages, and poor controllability of particle size, particle distribution and batch operation.

The proposed plasma, laser or explosive processes (EP-A 0 152 957, EP-A 0 151 490) also exhibit the disadvantages to which reference has been made.

A further proposal (EP-A 0 290 177) is concerned with carbonyl decomposition for the preparation of fine metallic powders.

The preparation of fine powders by specifically-conducted magnesiothermal reaction of the corresponding metal chlorides to prepare e.g. TiN or TiC also fails to achieve the fineness and uniformity of the powders prepared in accordance with the proposed process (G. W. Elger, Met. Transactions 20 B, 8, 1989, pp. 493–497).

Equally, the processes disclosed in U.S. Pat. Nos. 4,642, 207, 4,689,075, EP-A 152 957 and EP-A 151 490, which processes relate to the evaporation of metal by arc or electron beam and the reaction of gaseous reagents in a glow discharge, fail to meet the demand for a process which can be operated economically for the preparation of highly uniform and very fine powders.

The aim of this invention is consequently to make available a process which does not exhibit the disadvantages described in association with the prior art processes.

A process has now been found which meets this requirement. This process is the subject of this invention.

It is a process for the preparation of finely divided metal and/or ceramic powders by reacting appropriate metal compounds and appropriate reagents in the gas phase reaction (CVR), wherein the metal compound or compounds and the additional reagents are brought to reaction in the gaseous state in a reactor, homogeneously condensed directly out of the gas phase without the possibility of any wall reaction and subsequently separated from the reaction medium, which process is characterised in that the metal compounds and the reagents are introduced into the reactor separately at a temperature which is at least that of the reaction. If several metal compounds and/or reagents are to be introduced, the relevant gas mixtures must be selected in such a manner that no reaction takes place during heating-up which leads to formation of solid reaction products. The process according to the invention is especially advantageously conducted in a tube reactor. It is especially favourable if the metal compounds, the reagents and the product-particles pass through the reactor in a laminar flow pattern.

The separate pre-heating of the process gases to at least reaction temperature enables the nucleation site to be localised. Laminar flow in the reactor ensures a narrow residence time distribution for the nuclei or particles. This enables a very narrow particle size distribution to be achieved.

Consequently the metal compounds and the reagents should preferably be introduced into the reactor as coaxial laminar part currents.

However, in order to ensure thorough mixing of the two coaxial part currents, incorporation of an obstacle in the otherwise strictly laminar flow generates a Kármán vortex path which is defined in intensity and divergence.

A preferred embodiment of the process according to the invention therefore consists of the mixing in a defined manner of the coaxial, laminar part currents of the metal compound(s) and the reagents by means of a Kármán vortex path.

In order to prevent precipitation of the substances involved in the reaction on the wall of the reactor, a phenomenon strongly preferred as a result of the energy conditions, the reaction medium is preferably shielded from the wall of the reactor by a layer of inert-gas. This may be effected by introducing through specially shaped annular gaps in the reactor wall an inert gas current which becomes attached to the reactor wall as a result of the Coanda effect. The particles of metal or ceramic powder resulting from homogeneous precipitation out of the gas phase at typical residence times of between 10 and 300 msec leave the reactor together with the gaseous reaction products (e.g. HCl), the unreacted reagents and the inert gases which are blown in as carrier-gas and sweep gas and for the purpose of reducing HCl adsorption. Yields of up to 100%, calculated on the metal component, are obtainable in accordance with the process according to the invention.

The metal or ceramic powders are then preferably separated at temperatures above the boiling or sublimation temperatures of the metal compounds utilised, reagents and/or inevitable by-products formed during the reaction. Separation may advantageously be performed in a blowback filter. If this is operated at high temperatures of e.g. 600° C., adsorption of the gases, especially of those gases like HCl, $NH_3$, $TiCl_4$, etc. which are not inert, on the very large surface area of the ceramic or metal powders can be kept low. $NH_4Cl$ formation when preparing nitrides is especially prevented (higher than 350° C).

The remaining undesirable substances adsorbed on the surface of the powders may furthermore be removed in a vacuum vessel incorporated downstream, preferably again at temperatures of approximately 600° C. The finished powders should then be discharged from the installation with the exclusion of air.

Preferred metal compounds within the meaning of this invention are one or more from the group $BCl_3$, boric acid esters, boranes, $SiCl_4$, other chlorosilanes, silanes, metal halides, partially hydrated metal halides, metal hydrides, metal alcoholates, metal alkyls, metal amides, metal azides, metal boranates and metal carbonyls, Preferred additional reagents are one or more from the group $H_2$, $NH_3$, hydrazine, amines, $CH_4$, other alkanes, alkenes, alkines, aryls, $O_2$, air, $BCl_3$, boric acid esters, boranes, $SiCl_4$, other chlorosilanes and silanes.

Nano- or microdisperse (crystalline or amorphous) metal and/or ceramic powders may be prepared in accordance with the process according to the invention, wherein preferred metal and/or ceramic powders, carbides, nitrides, borides, silicides, phosphites, sulphides, oxides and/or combinations thereof of the elements B, Al, Si, Ti, Zr, Hf, V, Nb, Ta, Cr, Mo, W, La, Y, Fe, Co, Ni or these elements are alone or in combination with one another.

It is possible to prepare in accordance with the process according to the invention metal and ceramic powders having a particle size which may be adjusted between 3 and 3000 nm (3 μm), and which exhibit an extremely narrow particle size distribution. It is characteristic of particles prepared in this manner that they are totally devoid of particles which are substantially larger than the average particle size. Thus the powders prepared in accordance with the process according to the invention generally exhibit fewer than 1% individual particles deviating by more than 20% from the average particle size. No particles deviating by more than 50% are present.

The non-oxide powders exhibit extremely low oxygen contents (less than 1000 ppm). Further characteristics of the powders are their high purity, high surface purity and good reproducibility.

Depending on particle size and substance, non-oxide powders may be highly sensitive to air, possibly to the point of pyrophoricity. This property may be eliminated by defined surface-modification involving exposing the surface of such powders to action by gas/vapour mixtures.

FIG. 1 is a diagrammatic representation of an apparatus with which the process according to the invention may be conducted. The performance of the process according to the invention is discussed below by reference to FIG. 1. The process, substance and/or apparatus parameters explicitly referred to therein are merely representative of possibilities selected from among many and consequently do not limit the invention.

The solid, liquid or gaseous metal compounds are dosed into an externally provided vaporiser (1) or into a vaporiser (1a) provided inside the high-temperature furnace, are there vaporised at temperatures of from 200° to 2000° C., and conveyed into the gas pre-heater (2a) with an inert carrier gas ($N_2$, Ar or He). The additional reagents (3) such as $H_2$, $NH_3$ and $CH_4$, or air and/or oxygen for the preparation of metallic oxides, are also heated in a gas pre-heater (2). Prior to entering the tube reactor (4) the turbulent individual flow filaments leaving the gas pre-heaters (2) are formed in a nozzle (5) into two coaxial, laminar and rotationally symmetrical flow filaments. The central flow filament (6) which contains the metal component, and the encircling flow filament (7) which contains the remaining reagents, intermix under defined conditions in the tube reactor (4), whereupon the reaction commences at temperatures of between 500° and 2000° C., e.g. according to the following examples:

| $TiCl_4$ | + | $NH_3$ | + | $½H_2$ | → | TiN | + | 4 HCl or |
|---|---|---|---|---|---|---|---|---|
| $TiCl_4$ | + | $CH_4$ | | | → | TiC | + | 4 HCl or |
| $AlCl_3$ | + | $NH_3$ | | | → | AlN | + | 3 HCl or |
| $TiCl_4$ | + | $2BCl_3$ | + | $5H_2$ | → | $TiB_2$ | + | 10 HCl or |
| $TaCl_5$ | + | $CH_4$ | + | $½H_2$ | → | TaC | + | 5 HCl or |
| $4BCl_3$ | + | $CH_4$ | + | $4H_2$ | → | $B_4C$ | + | 12 HCl or |
| $WCl_6$ | + | | + | $3H_2$ | → | W | + | 6 HCl or |
| $MoCl_5$ | + | $2SiCl_4$ | + | $6½H_2$ | → | $MoSi_2$ | + | 13 HCl or |
| $2NbCl_5$ | + | $2½O_2$ | | | → | $Nb_2O_5$ | + | 5 $Cl_2$ or |
| $3SiH_4$ | + | $4NH_3$ | | | → | $Si_3N_4$ | + | 12 $H_2$ or |
| $ZrCl_4$ | + | $O_2$ | | | → | $ZrO_2$ | + | 2 $Cl_2$ or |
| $BrCl_4$ | + | $2H_2O$ | | | → | $ZrO_2$ | + | 4 HCl or |
| $NiCl_2$ | + | $H_2$ | | | → | Ni | + | 2 HCl |

In order to guarantee thorough mixing of the two coaxial flow filaments, an obstacle (17) may be incorporated to generate a Kármán vortex path in the otherwise strictly laminar flow. The two coaxial flow filaments are separated at the nozzle outlet by a weak inert gas current (16) in order to prevent fouling of the nozzle (5).

In order to suppress heterogeneous precipitation of these substances on the hot reactor wall, a phenomenon to which the energy conditions give strong preference, the wall is swept by an inert gas current (9) ($N_2$, Ar or He) delivered through annular gaps (8) which becomes attached to the reactor wall as a result of the Coanda effect. The metal and/or ceramic powder particles produced in the reactor by homogeneous precipitation from the gas phase leave the reactor together with the gaseous reaction products (e.g. HCl), the inert gases and the unreacted reagents, and pass direct into a blow-back filter (10), in which they are precipitated. The blow-back filter (10) is operated at temperatures of between 300° and 1000° C., which keeps adsorption of the gases, especially those such as HCl, $NH_3$ and $TiCl_4$ which are not inert, on the very large surface area of these powders to a low level. $NH_4Cl$ formation from excess $NH_3$ (in the preparation of metal nitrides) and HCl is suppressed. In a follow-on vessel (11) adsorbed gas residues on the powders are further reduced by preferably alternating application of vacuum and flooding with various gases at 300° to 1000° C. Efficacious results are obtained when gases such as $N_2$, Ar or Kr are utilised. The utilisation of $SF_6$ is especially preferred.

The preparation of metastable substance systems and particles having core/mantle structures is also possible in accordance with the process according to the invention. In this case, metastable substance systems are obtained by setting very rapid cooling-off rates in the lower region of the reactor.

The particles having a core/mantle structure are obtained by introducing additional reaction gases in the lower region of the reactor.

The powders pass from the evacuation vessel (11) into the cooling-off vessel (12), before passing through the lock (13) into the collection and despatch vessel (14). The particle surfaces are surface-modifiable in a defined manner in the cooling-off vessel (12) by blowing in various gas/vapour mixtures.

Coated graphite, especially fine-grain graphite may preferably be used as a material for those components which are exposed to temperatures of up to and over 2000° C., such as heat exchanger (2) and (2a), nozzle (5), reactor (4) and reactor jacket tube (15). A coating may for example be required if the necessary chemical resistance of the graphite to the gases utilised such as metal chlorides, HCl, $H_2$, $NH_3$, $N_2$ and $O_2$ is inadequate at the temperatures obtaining, or if erosion at higher flow velocities (0.5–50 m/sec) is very considerable or if the gas-tightness of the graphite can be increased by this means or if the surface roughness of the components of the reactor can be reduced by this means.

Coatings which may be utilised are e.g. SiC, $B_4C$, TiN, TiC, $Al_2O_3$, $Ta_2O_3$ and Ni (only up to 1200° C.). Combinations of various coatings, e.g. with "true to type" facing layer, are possible. These coatings may advantageously be applied by means of chemical vapour deposition, plasma spraying and electrolysis (Ni).

Oxide ceramic materials offer potential for such components for oxide preparation. If only low temperatures are necessary, metallic materials may also be utilised.

Three procedures may be utilised simultaneously to adjust the particle sizes of the ceramic and metal powders:

setting a definite ratio between the reagent gases and the inert gases.

setting a definite pressure setting a definite temperature-residence time profile along the axis of the reactor.

The temperature-residence time profile is set as follows:

by designating two or more heating zones from the beginning of the gas pre-heater (2) to the end of the tube reactor (4).

by varying the reactor cross section along its longitudinal axis.

by varying the gas flow throughputs and hence, at a predetermined reactor cross section, the flow velocities.

A substantial advantage of the variability according to the invention of the temperature-residence time profile is the possibility of uncoupling the nucleation zone from the growth zone. This enables the preparation according to the invention of "coarser" powders (e.g. the range about 0.1 μm to about 3 μm in the case of TiN) at very low temperature and short residence time (i.e. small reactor cross section for a given length) by formation of only few nuclei, which can then grow to form "coarse" particles at high temperature and long residence time (large reactor cross section). It is equally possible to prepare "fine" powders (e.g. in the case of TiN the range about 3 nm to about 100 nm): formation of a very large number of nuclei is achieved within a high temperature range and with a relatively long residence time, and these then continue to grow only slowly in the further reactor at low temperatures and short residence time (small reactor cross section). It is possible to set all the intermediate points between the limit cases qualitatively represented here.

It is possible to passivate those of the powders which are highly air-sensitive, possibly to the point of pyrophoricity, in the cooling-off vessel (12), by blowing in a suitable mixture of gas/vapour. The surfaces of the particles of these ceramic powders may be coated both with an oxide coating of a defined thickness and with suitable organic compounds such as higher alcohols, amines or directly with sintering aids such as paraffins in an inert carrier gas current. Coating may also be performed with a view to the further processing possibilities of the powders.

The oxide coatings may be applied e.g. with a defined humidified inert gas-air current, but also with an inert gas/$CO_2$ current (preferably suitable for carbides).

The invention is further illustrated below by means of examples, without these, however, constituting any limitation.

Example 1

TiN was prepared according to the reaction equation $$TiCl_4 + NH_3 + \tfrac{1}{2} H_2 \rightarrow TiN + 4HCl$$

in an apparatus according to FIG. 1, while maintaining an $NH_3$ and $H_2$ excess.

100 g/min of $TiCl_4$ (liquid, b.p. 136° C.) were dosed for this purpose into the vaporiser (1), vaporised and heated to 800° C. together with 50 Nl/min $N_2$. This gas mixture was fed into the gas pre-heater (2a). The reagents $H_2$ (200 Nl/min) and $NH_3$ (95 Nl/min) were introduced into the gas preheater (2). The reagents were pre-heated separately from one another to a temperature of approximately 1000° C. Temperature measurement for this purpose was performed using a W5Re-W26Re thermocouple (18) at the point indicated in FIG. 1 (1175° C.). The turbulent individual flow filaments leaving the gas pre-heaters (2) were formed in the outer section of the nozzle (5) into a homogeneous, rotationally symmetrical and laminar annular current prior to entering the reaction tube (4). The gas current leaving the gas pre-heater (2a) was also laminarised in the nozzle (5) and introduced into the annular flow. The nozzle (5) for the purpose consisted of three part nozzles coaxially disposed in relation to one another. An inert gas current (16) was delivered through the central part nozzle, which displaced the site of commencement of reaction, i.e. the convergence of the two part currents (6) and (7) away from the nozzle and into the reaction tube. A Kármán vortex path was generated in the inner flow filament by means of the obstacle (17)

having a characterising dimension of 3.0 mm (disposed in the longitudinal axis of the nozzle). The reaction tube, total length 1100 mm, had at the nozzle outlet an internal diameter of 40 mm, 200 mm below the nozzle an internal diameter of 30 mm and at the outlet 50 mm. This gave continuous variation in the internal cross section taking into account the laws of flow mechanics. The reaction tube (4) was composed of 18 segments, each connected by means of a spacing and centering ring. An annular gap (8) was effected at each of these points. 1080° C. was set as the temperature of the reaction tube (4), measured on the outer wall of the reactor, 400 mm below the nozzle, using the W5Re-W26Re thermocouple (19). Pressure inside the reaction tube (4) was practically identical to pressure inside the blow-back filter (10). This was 250 mbar above atmospheric pressure. The reactor wall was swept with 200 Nl/min $N_2$ delivered through 18 annular gaps (8). Neglect of inert gas sweeping of the reactor wall allows fouling to occur, which can sometimes rapidly lead to blockage of the reactor and thus interruption of the process; however, the changing reactor geometry results in any case in production of an equally changing-product. In order to reduce the HCl partial pressure 200 Nl/min $N_2$ was blown into the reaction tube (4) through the 6th annular gap from the bottom with an additional gas inlet device. The product (TiN having a uniform particle size of about 10 nm) was separated from the gases ($H_2$, $NH_3$, HCl, $N_2$) at a temperature of 600° C. in the blow-back filter (10).

This temperature was selected on the one hand in order to prevent $NH_4Cl$ formation (<350° C.), and on the other, to hold primary coating of the very large particle surfaces (115 $m^2/g$) with HCl to a low level (about 1.5% Cl).

The TiN thus prepared was collected in the blow-back filter or 40 min (i.e. 1300 g), in order then to be transferred into the evacuating vessel (11). 8 pump-flood cycles each with final vacuum of 0.1 mbar absolute were performed in this vessel over a period of 35 min. The vessel was in each case flooded with Ar to a pressure of 1100 mbar absolute. After 35 min the TiN powder thus treated was transferred into the cooling-off vessel (12). Targetted surface tailoring is also possible in this vessel by means of blowing in various mixtures of gas/vapour. After cooling to <50° C. the powder was transferred through the lock (13) to the collecting and despatch vessel, Without making contact with the outside air.

The pyrophoric TiN powder showed an extremely narrow particle distribution, at a specific surface area of 115 $m^2/g$, in accordance with BET, measured by the $N_2$-1-point method (DIN 66 131), equivalent to 10 nm.

An REM photograph of this TiN powder having a specific surface area of 115 $m^2/g$ showed the very narrow distribution of particle dimensions and the absence of oversized particles. Less than 1% of individual particles according to this picture exhibit a deviation of more than 10% and no individual particles a deviation of more than 40% from the average particle size. The current state of the art in measuring techniques is able to provide reliable information on the particle size distribution of such extremely fine powders only if methods which produce pictures are used (e.g. REM, TEM).

Analysis of this TiN powder revealed an oxygen content of 95 ppm, and the sum of non-oxide contaminants was 800 ppm.

Example 2

TiN was prepared according to the reaction equation $$TiCl_4 + NH_3 + \tfrac{1}{2} H_2 \rightarrow TiN + 4HCl$$

in an apparatus according to FIG. 1, while maintaining an $NH_3$ and $H_2$ excess.

100 g/min of $TiCl_4$ (liquid, b.p. 136° C.) were dosed for this purpose into the vaporiser (1), vaporised and heated to 950° C. together with 50 Nl/min $N_2$. This gas mixture was fed into the gas pre-heater (2a). The reagents $H_2$ (200 Nl/min) and $NH_3$ (95 Nl/min) were introduced into the gas pre-heater (2). The reagents were pre-heated separately from one another to a temperature of approximately 700° C. Temperature measurement for this purpose was performed using a W5Re-W26Re thermocouple (18) at the point indicated in FIG. 1 (850° C.). The turbulent individual flow filaments leaving the gas pre-heaters (2) were formed in the outer section of the nozzle (5) into a homogeneous, rotationally symmetrical and laminar annular current prior to entering the reaction tube (4). The gas current leaving the gas pre-heater (2a) was also laminarised in the nozzle (5) and introduced into the annular flow. The nozzle (5) for the purpose consisted of three part nozzles coaxially disposed in relation to one another. An inert gas current (16) was delivered through the central part nozzle, which displaced the site of commencement of reaction, i.e. the convergence of the two part currents (6) and (7) away from the nozzle and into the reaction tube. A Kármán vortex path was generated in the inner flow filament by means of the obstacle (17), having a characterising dimension of 4.0 mm (disposed in the longitudinal axis of the nozzle). The reaction tube, total length 1320 mm, had at the nozzle outlet an internal diameter of 25 mm, from 120 to 180 mm below the nozzle the internal diameter widened to 48 mm; at the outlet it was 65 mm. This gave continuous variation in the internal cross section taking into account the laws of flow mechanics. The reaction tube (4) was composed of 22 segments, each connected by means of a spacing and centering ring. An annular gap (8) was effected at each of these points.

1570° C. was set as the temperature of the reaction tube (4), measured on the outer wall of the reactor, 400 mm below the nozzle, using the W5Re-W26Re thermocouple (19). Pressure inside the reaction tube (4) was practically identical to pressure inside the blow-back filter (10). This was 250 mbar above atmospheric pressure. The reactor wall was swept with 200 Nl/min $N_2$ delivered through 22 annular gaps (8). Neglect of inert gas sweeping of the reactor wall allows fouling to occur, which can sometimes rapidly lead to blockage of the reactor and thus interruption of the process; however, the changing reactor geometry results in any case in production of an equally changing product. In order to reduce the HCl partial pressure 200 Nl/min Ar was blown into the reaction tube (4) through a further annular gap in the 6th segment from the bottom with an additional gas inlet device. The product (TiN having a uniform particle size of about 50 nm) was separated from the gases ($H_2$, $NH_3$, HCl, $N_2$) at a temperature of 600° C. in the blow-back filter (10).

This temperature was selected on the one hand in order to prevent $NH_4Cl$ formation (>350° C.), and on the other, to hold primary coating of the very large particle surfaces (41.5 $m^2/g$) with HCl to a low level (about 1% Cl).

The TiN thus prepared was collected in the blow-back filter for 40 min (i.e. 1300 g), in order then to be transferred into the evacuating vessel (11). 8 pump-flood cycles each with final vacuum of 0.1 mbar absolute were performed in this vessel over a period of 35 min. The vessel was in each case flooded with Ar to a pressure of 1100 mbar absolute. After 35 min the TiN powder thus treated was transferred into the cooling-off vessel (12). Targetted surface tailoring is also possible in this vessel by means of blowing in various mixtures of gas/vapour. After cooling to <50° C. the powder was transferred through the lock (13) to the collecting and despatch vessel, without making contact with the outside air.

The pyrophoric TiN powder showed an extremely narrow particle distribution, at a specific surface area of 41.5 m²/g, in accordance with BET, measured by the $N_2$-1-point method (DIN 66 131), equivalent to 50 nm.

An REM photograph of this TiN powder having a specific surface area of 41.5 m²/g showed the very narrow distribution of particle dimensions and the absence of oversized particles. Less than 1% of individual particles according to this picture exhibit a deviation of more than 10% and no individual particles a deviation of more than 40% from the average particle size. The current state of the art in measuring techniques is able to provide reliable information on the particle size distribution of such extremely fine powders only if methods which produce pictures are used (e.g. REM, TEM).

Analysis of this TiN powder revealed an oxygen content of 70 ppm and the sum of non-oxide contaminants was 820 ppm.

Example 3

TiC was prepared according to the reaction equation $$TiCl_4 + CH_4 \rightarrow TiC + 4HCl$$

in an apparatus according to FIG. 1, while maintaining a slight $CH_4$ excess and adding additional $H_2$.

90 g/min of $TiCl_4$ (liquid, b.p. 136° C.) were dosed for this purpose into the vaporiser (1a), vaporised and heated to 1200° C. in the gas pre-heater (2a) together with 50 Nl/min Ar. The reagents $H_2$ (170 Nl/min) and $CH_4$ (25 Nl/min) were introduced into the gas pre-heater (2). The reagents were pre-heated separately from one another to a temperature of approximately 1050° C. Temperature measurement for this purpose was performed using a W5Re-W26Re thermocouple (18) at the point indicated in FIG. 1 (1200° C.). The turbulent individual flow filaments leaving the gas pre-heaters (2) were formed in the outer section of the nozzle (5) into a homogeneous, rotationally symmetrical and laminar annular current prior to entering the reaction tube (4). The gas current leaving the gas pre-heater (2a) was also laminarised in the nozzle (5) and introduced into the annular flow. A Kármán vortex path was generated in this inner flow filament by means of the obstacle (17) having a characterising dimension of 4.0 mm disposed in the longitudinal axis of the nozzle. The reaction tube, total length 1320 mm, had at the nozzle outlet an internal diameter of 25 mm, from 120 to 180 mm below the nozzle the internal diameter widened to 48 mm; at the outlet it was 65 mm. This gave continuous variation in the internal cross section taking into account the laws of flow mechanics. The reaction tube (4) was composed of 22 segments, each connected by means of a spacing and centering ring. An annular gap (8) was effected at each of these points.

1700° C. was set as the temperature of the reaction tube (4), measured on the outer wall of the reactor, 400 mm below the nozzle, using the W5Re-W26Re thermocouple (19). Pressure inside the reaction tube (4) was practically identical to pressure inside the blow-back filter (10). This was 250 mbar above atmospheric pressure. The reactor wall was swept with 200 Nl/min Ar delivered through 22 annular gaps (8). Neglect of inert gas sweeping of the reactor wall allows fouling to occur, which can sometimes rapidly lead to blockage of the reactor and thus interruption of the process; however, the changing reactor geometry results in any case in production of an equally changing product. In order to reduce the HCl partial pressure 200 Nl/min Ar was blown into the reaction tube (4) through a further annular gap in the 6th segment from the bottom with an additional gas inlet device. The product (TiC having a uniform particle size of about 50 nm) was separated from the gases ($H_2$, $CH_4$, HCl, Ar) at a temperature of 600° C. in the blow-back filter (10). This temperature was selected in order to hold primary coating of the very large particle surfaces (45.6 m²/g) with HCl to a low level (about 1% Cl).

The TiC thus prepared was collected in the blow-back filter for 40 min (i.e. 1300 g), in order then to be transferred into the evacuating vessel (11). 8 pump-flood cycles each with final vacuum of 0.1 mbar absolute were performed in this vessel over a period of 35 min. The vessel was in each case flooded with Ar to a pressure of 1100 mbar absolute. After 35 min the TiC powder thus treated was transferred into the cooling-off vessel (12). Targetted surface tailoring is also possible in this vessel by means of blowing in various mixtures of gas/vapour. After cooling to <50° C. the powder was transferred through the lock (13) to the collecting and despatch vessel, without making contact with the outside air.

The pyrophoric TiC powder showed an extremely narrow particle distribution, at a specific surface area of 45.6 m²/g in accordance with BET, measured by the $N_2$-1-point method (DIN 66 131), equivalent to 10 nm.

An REM photograph of this TiC powder having a specific surface area of 4.65 m²/g showed the very narrow distribution of particle dimensions and the absence of oversized particles. Less than 1% of individual particles according to this picture exhibit a deviation of more than 10% and no individual particles a deviation of more than 40% from the average particle size. The current state of the art in measuring techniques is able to provide reliable information on the particle size distribution of such extremely fine powders only if methods which produce pictures are used (e.g. REM, TEM).

Analysis of this TiC powder revealed an oxygen content of 80 ppm, and the sum of non-oxide contaminants was 890 ppm.

Example 4

Ta was prepared according to the reaction equation $$TaCl_5 + 2\tfrac{1}{2} H_2 \rightarrow Ta + 5HCl$$

in an apparatus according to FIG. 1, while maintaining an $H_2$ excess.

100 g/min of $TaCl_5$ (solid, b.p. 242° C.) were dosed for this purpose into the vaporiser (1a), vaporised and heated to 1300° C. in the gas pre-heater (2a) together with 50 Nl/min Ar. The reagent $H_2$ (200 Nl/min) was introduced into the gas pre-heater (2). The reagents were pre-heated separately from one another to a temperature of approximately 1300° C. Temperature measurement for this purpose was performed using a W5Re-W26Re thermocouple (18) at the point indicated in FIG. 1 (1450° C). The turbulent individual flow filaments leaving the gas pre-heaters (2) were formed in the outer section of the nozzle (5) into a homogeneous, rotationally symmetrical and laminar annular current prior to entering the reaction tube (4). The gas current leaving the gas pre-heater (2a) was also laminarised in the nozzle (5) and introduced into the annular flow. The nozzle (5) for the purpose consisted of three part nozzles coaxially disposed in relation to one another. An inert gas current (16) was delivered through the central part nozzle, which displaced the site of commencement of reaction, i.e. the convergence of the two part currents (6) and (7) away from the nozzle and into the reaction tube. A Kármán vortex path was generated in the inner flow filament by means of the obstacle (17), having a characterising dimension of 3.0 mm (disposed in the longitudinal axis of the nozzle). The tube reactor, total length 1100 mm, had at the nozzle outlet an internal diameter of 40 mm, 200 mm below the nozzle an internal diameter of 30 mm, and at the outlet 50 mm. This gave continuous variation in the internal cross section taking into account the laws of flow mechanics. The reaction tube (4) was composed of 18 segments, each connected by means of a spacing and centering ring. An annular gap (8) was effected at each of these points. 1230° C. was set as the temperature of the reaction tube (4), measured on the outer wall of the reactor, 400 mm below the nozzle, using the W5Re-W26Re thermocouple (19). Pressure inside the reaction tube (4) was practically identical to pressure inside the blow-back filter (10). This was 250 mbar above atmospheric pressure. The reactor wall was swept with 200 Nl/min Ar delivered through 18 annular gaps (8). Neglect of-inert gas sweeping of the reactor wall allows fouling occur, which can sometimes rapidly lead to blockage of the reactor and thus interruption of the process; however, the changing reactor geometry results in any case in production of an equally changing product. In order to reduce the HCl partial pressure 200 Nl/min Ar was blown into the reaction tube (4) through the 6th annular gap from the bottom with an additional gas inlet device. The product (Ta having a uniform particle size of about 25 nm) was separated from the gases ($H_2$, HCl, Ar) at a temperature of 600° C. in the blow-back filter (10).

This temperature was selected in order to hold primary coating of the very large particle surfaces (18 $m^2$/g) with HCl to a low level (about 0.8% Cl).

The Ta thus prepared was collected in the blow-back filter for 40 min (i.e. 2000 g), in order then to be transferred into the evacuating vessel (11). 8 pump-flood cycles each with final vacuum of 0.1 mbar absolute were performed in this vessel over a period of 35 min. The vessel was in each case flooded with Ar to a pressure of 1100 mbar absolute. After 35 min the Ta powder thus treated was transferred into the cooling-off vessel (12). Targetted surface tailoring is also possible in this vessel by means of blowing in various mixtures of gas/vapour. After cooling to <50° C. the powder was transferred through the lock (13) to the collecting and despatch vessel, without making contact with the outside air.

The pyrophoric Ta powder showed an extremely narrow particle distribution, at a specific surface area of 17 $m^2$/g, in accordance with BET, measured by the $N_2$-1-point method (DIN 66 131), equivalent to 25 nm.

An REM photograph of this Ta powder having a specific surface area of 25 $m^2$/g showed the very narrow distribution of particle dimensions and the absence of oversized particles. Less than 1% of individual particles according to this picture exhibit a deviation of more than 10% and no individual particles a deviation of more than 40% from the average particle size. The current state of the art in measuring techniques is able to provide reliable information on the particle size distribution of such extremely fine powders only if methods which produce pictures are used (e.g. REM, TEM).

Analysis of this Ta powder revealed an oxygen content of 70 ppm, and the sum of non-oxide contaminants was 430 ppm.

Example 5

$Nb_2O_5$ was prepared according to the reaction equation $$2\ NbCl_5 + 2\ \tfrac{1}{2}\ O_2 \rightarrow Nb_2O_5 + 5Cl_2$$

in an apparatus according to FIG. 1. An air excess was utilised as oxygen carrier.

100 g/min of $NbCl_5$ (solid, b.p. 254° C.) were dosed for this purpose into the vaporiser (1a), vaporised and heated to 1250° C. in the gas pre-heater (2a) together with 50 Nl/min $N_2$. The air (400 Nl/min) was introduced into the gas pre-heater (2). The reagents were pre-heated separately from one another to a temperature of approximately 1200° C. Temperature measurement for this purpose was performed using a W5Re-W26Re thermocouple (18) at the point indicated in FIG. 1 (1450° C). The turbulent individual flow filaments leaving the gas pre-heaters (2) were formed in the outer section of the nozzle (5) into a homogeneous, rotationally symmetrical and laminar annular current prior to entering the reaction tube (4). The gas current leaving the gas pre-heater (2a) was also laminarised in the nozzle (5) and introduced into the annular flow. The nozzle (5) for the purpose consisted of three part nozzles coaxially disposed in relation to one another. An inert gas current (16) was delivered through the central part nozzle, which displaced the site of commencement of reaction, i.e. the convergence of the two part currents (6) and (7) away from the nozzle and into the reaction tube. A Kármán vortex path was generated in the inner flow filament by means of the obstacle (17) having a characterising dimension of 4.0 mm (disposed in the longitudinal axis of the nozzle). The reaction tube, total length 1100 mm, had at the nozzle outlet an internal diameter of 45 mm, 200 mm below the nozzle the internal diameter was 30 mm. After widening to 90 mm (at a point 290 mm below the nozzle), the internal diameter at the outlet was 105 mm.

This gave continuous variation in the internal cross section taking into account the laws of flow mechanics. The reaction tube (4) was composed of 18 segments, each connected by means of a spacing and centering ring. An annular gap (8) was effected at each of these points.

The nozzle (5), the reaction tube (4) and the heat exchanger (2) were manufactured in oxide ceramic. The heat exchanger (2a) was of coated graphite. The marked widening of the reactor cross section is necessary so that the by-product, $NbO_2Cl$, is also converted into $Nb_2O_5$, which requires a long residence time.

1300° C. was set as the temperature of the reaction tube (4), measured on the outer wall of the reactor, 400 mm below the nozzle, using the W5Re-W26Re thermocouple (19). Pressure inside the reaction tube (4) was practically identical to pressure inside the blow-back filter (10). This was 250 mbar above atmospheric pressure. The reactor wall was swept with 200 Nl/min $N_2$ delivered-through 18 annular gaps (8). Neglect of inert gas sweeping of the reactor wall allows fouling to occur, which can sometimes rapidly lead to blockage of the reactor and thus interruption of the process; however, the changing reactor geometry results in any case in production of an equally changing product. In order to reduce the $Cl_2$ partial pressure 200 Nl/min $N_2$ was blown into the reaction tube (4) through the 6th annular gap from the bottom with an additional gas inlet device. The product ($Nb_2O_5$ having a uniform particle size of about 45 nm) was separated from the gases ($Cl_2$, $N_2$) at a temperature of 600° C. in the blow-back filter (10).

This temperature was selected in order to hold primary coating of the very large particle surfaces (42 $m^2$/g) with $Cl_2$ to a low level.

The $Nb_2O_5$ thus prepared was collected in the blow-back filter for 40 min (i.e. 1950 g), in order then to be transferred into the evacuating vessel (11). 8 pump-flood cycles each with final vacuum of 0.1 mbar absolute were performed in this vessel over a period of 35 min. The vessel was in each case flooded with Ar to a pressure of 1100 mbar absolute. After 35 min the $Nb_2O_5$ powder thus treated was transferred into the cooling-off vessel (12). Targetted surface tailoring is also possible in this vessel by means of blowing in various mixtures of gas/vapour. After cooling to <50° C. the powder was transferred through the lock (13) to the collecting and despatch vessel, without making contact with the outside air.

The $Nb_2O_5$ powder showed an extremely narrow particle distribution, at a specific surface area of 42 $m^2/g$, in accordance with BET, measured by the $N_2$-1-point method (DIN 66 131), equivalent to 45 nm.

An REM photograph of this $Nb_2O_5$ powder having a specific surface area of 42 $m^2/g$ showed the very narrow distribution of particle dimensions and the absence of oversized particles. Less than 1% of individual particles according to this picture exhibit a deviation of more than 10% and no individual particles a deviation of more than 40% from the average particle size. The current state of the art in measuring techniques is able to provide reliable information on the particle size distribution of such extremely fine powders only if methods which produce pictures are used (e.g. REM, TEM).

Analysis of this $Nb_2O_5$ powder revealed the sum of metallic contaminants to be 700 ppm.

What is claimed is:

1. A process for the preparation of at least one of finely divided metal and ceramic powders by reacting at least one metal compound and at least one reagent in a gas phase (CVR) reaction at a reaction temperature, said at least one metal compound and said at least one reagent being separately introduced into a reactor as coaxial, laminar part currents at a temperature which is at least the reaction temperature, wherein the at least one metal compound and the at least one reagent are brought to reaction in the reactor in the gaseous state to produce at least one reaction product which is condensed directly from the gas phase while excluding any wall reaction and further wherein the at least one reaction product, comprising said at least one of finely divided metal and ceramic powders, is subsequently separated from any remaining reagents after said reaction.

2. Process according to claim 1, wherein the reactor is a tube reactor.

3. Process according to claim 1, wherein the at least one metal compound, the at least one reagent and the at least one of finely divided metal and ceramic powders pass through the reactor in a laminar flow.

4. Process according to claim 1, wherein the coaxial, laminar part currents of the at least one metal compound and the at least one reagent are thoroughly mixed in a defined manner by means of a Kármán vortex path.

5. Process according to claim 1, wherein the at least one metal compound and at least one reagent are shielded from the reactor wall by means of an inert gas layer.

6. Process according to claim 1, wherein the at least one of finely divided metal and ceramic powders are separated at temperatures above the boiling or sublimation temperatures of all substances exiting the reactor except the at least one of finely divided metal and ceramic powders formed in the reactor.

7. Process according to claim 6, wherein the at least one of metal and ceramic powders are purified after separation by the alternating application of vacuum and flooding With at least one gas selected from $N_2$, Ar, Kr and $SF_6$.

8. Process according to claim 6, wherein the at least one of metal or ceramic powders are surface-modified after separation by exposure to the action of at least one of gases and vapours.

9. Process according to claim 1, wherein the at least one metal compound comprises at least one compound selected from the group consisting of $BCl_3$, boric acid esters, boranes, halosilanes, silanes, metal halides, partially hydrated metal halides, metal hydrides, metal alcoholates, metal alkyls, metal amides, metal azides, metal boranates and metal carbonyls.

10. Process according to claim 1, wherein the at least one reagent comprises at least one of $H_2$, $NH_3$, hydrazine, amines, alkanes, alkenes, alkines, aryls, $O_2$, air, $NO_2$, $BCl_3$, boric acid esters, boranes, chlorosilanes, silanes, $PCl_5$, phosphoric acid chlorides, phosphoric acid esters, $H_2S$, $SO_2$, $SO_3$, $C_2S$, mercaptans and thioethers.

11. Process according to claim 1, wherein the at least one of metal and ceramic powders comprise at least one of carbides, nitrides, borides, silicides, phosphites, sulphides and oxides of at least one element selected from the group consisting of B, Al, Si, Ti, Zr, Hf, V, Nb, Ta, Cr, Mo, W, La, Y, Fe, Co and Ni.

12. Process according to claim 1, wherein the at least one of metal and ceramic powders comprise at least one element selected from the group consisting of B, Al, Si, Ti, Zr, Hf, V, Nb, Ta, Cr, Mo, W, La, Y, Fe, Co and Ni.

13. Process according to claim 7, wherein the at least one of metal or ceramic powders are surface-modified after purification by exposure to the action of at least-one of gases and vapours.

14. Process according to claim 9, wherein the at least one of metal and ceramic powders comprise at least one of carbides, nitrides, borides, silicides, phosphites, sulphides and oxides of at least one element selected from the group consisting of B, Al, Si, Ti, Zr, Hf, V, Nb, Ta, Cr, Mo, W, La, Y, Fe, Co and Ni.

15. Process according to claim 10, wherein the at least one of metal and ceramic powders comprise at least one of carbides, nitrides, borides, silicides, phosphites, sulphides and oxides of at least one element selected from the group consisting of B, Al, Si, Ti, Zr, Hf, V, Nb, Ta, Cr, Mo, W, La, Y, Fe, Co and Ni.

16. Process according to claim 9, wherein the at least one of metal and ceramic powders comprise at least one element selected from the group consisting of B, Al, Si, Ti, Zr, Hf, V, Nb, Ta, Cr, Mo, W, La, Y, Fe, Co and Ni.

17. Process according to claim 11, wherein the at least one of metal and ceramic powders comprise at least one element selected from the group consisting of B, Al, Si, Ti, Zr, Hf, V, Nb, Ta, Cr, Mo, W, La, Y, Fe, Co and Ni.

18. Process according to claim 2, wherein the at least one metal compound, the at least one reagent and the at least one of finely divided metal and ceramic powders pass through the reactor in a laminar flow.

* * * * *